United States Patent
Tümler et al.

(10) Patent No.: US 10,775,634 B2
(45) Date of Patent: Sep. 15, 2020

(54) METHOD FOR CALCULATING THE MOVEMENT DATA OF THE HEAD OF A DRIVER OF A TRANSPORTATION VEHICLE, DATA GLASSES AND TRANSPORTATION VEHICLE FOR USE IN THE METHOD, AND COMPUTER PROGRAM

(71) Applicant: VOLKSWAGEN AKTIENGESELLSCHAFT, Wolfsburg (DE)

(72) Inventors: Johannes Tümler, Wellen (DE); Michael Wittkämper, Braunschweig (DE); Andro Kleen, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/204,232

(22) Filed: Nov. 29, 2018

(65) Prior Publication Data
US 2019/0171024 A1 Jun. 6, 2019

(30) Foreign Application Priority Data
Dec. 5, 2017 (DE) .................. 10 2017 221 871

(51) Int. Cl.
*G02B 27/01* (2006.01)
*G06F 3/01* (2006.01)
*G06K 9/00* (2006.01)

(52) U.S. Cl.
CPC ....... *G02B 27/0179* (2013.01); *G02B 27/017* (2013.01); *G06F 3/012* (2013.01);
(Continued)

(58) Field of Classification Search
None
See application file for complete search history.

(56) References Cited

U.S. PATENT DOCUMENTS 10,503,245 B2 * 12/2019 Rothkopf .............. G06F 3/0346
2002/0114493 A1 * 8/2002 McNitt ................ A61B 5/1124
382/107
(Continued)

FOREIGN PATENT DOCUMENTS

DE 102014202712 A1 8/2015
DE 102014206626 A1 10/2015
(Continued)

OTHER PUBLICATIONS

Berg; The vehicle in-the-loop—a tool for the development and evaluation of safety-critical driver assistance systems; Dissertation; Department of Aerospace Engineering at the University of the Federal Armed Forces in Munich; 2014; downloaded from http://athene-forschung.unibw.de/note?id=97267.
(Continued)

*Primary Examiner* — Dorothy Harris
(74) *Attorney, Agent, or Firm* — Barnes & Thornburg, LLP (57) ABSTRACT

A method for calculating the motion data of the head of a driver of a transportation vehicle wherein the driver is wearing a pair of data glasses. The data glasses are equipped with at least one glasses measurement unit which detects the movements of the head of the driver. The transportation vehicle is equipped with a transportation vehicle measurement unit which detects at least the accelerations of the transportation vehicle. The measured accelerations of the transportation vehicle are transferred wirelessly to the data glasses. The calculation of the head pose is carried out in a special processor unit of the data glasses which includes an implementation of a Kalman filter in which the motion data of the glasses measurement unit, corrected by the motion data of the transportation vehicle measurement unit, are
(Continued)

merged with the motion data of an additional glasses measurement unit.

14 Claims, 5 Drawing Sheets

(52) U.S. Cl.
CPC ..... *G06K 9/00335* (2013.01); *G06K 9/00671* (2013.01); *G06K 9/00845* (2013.01); *G02B 2027/0183* (2013.01); *G02B 2027/0187* (2013.01)

(56) References Cited

U.S. PATENT DOCUMENTS

| | | | | |
|---|---|---|---|---|
| 2014/0168261 | A1* | 6/2014 | Margolis | G06F 3/011 345/633 |
| 2014/0379260 | A1* | 12/2014 | Maihoefer | G01C 21/365 701/538 |
| 2015/0097864 | A1* | 4/2015 | Alaniz | G06T 7/20 345/633 |
| 2016/0239020 | A1* | 8/2016 | Lauber | B60K 28/02 |
| 2017/0024624 | A1* | 1/2017 | Bieg | G06K 9/00832 |
| 2017/0050743 | A1* | 2/2017 | Cole | B64D 43/00 |
| 2017/0277280 | A1* | 9/2017 | Peri | G02B 27/0179 |
| 2018/0081426 | A1* | 3/2018 | Rothkopf | G06F 3/0346 |
| 2018/0096501 | A1* | 4/2018 | Anderson | G06T 11/60 |
| 2019/0189087 | A1* | 6/2019 | Helot | B60K 35/00 |

FOREIGN PATENT DOCUMENTS

| | | |
|---|---|---|
| DE | 102014214516 A1 | 1/2016 |
| DE | 102014221608 A1 | 4/2016 |
| DE | 102014019579 A1 | 6/2016 |

OTHER PUBLICATIONS

Wiesner et al.; 3D-FRC: Depiction of the future road course in the head-up display; IEEE International Symposium on Mixed and Augmented Reality; 2017.

* cited by examiner

METHOD FOR CALCULATING THE MOVEMENT DATA OF THE HEAD OF A DRIVER OF A TRANSPORTATION VEHICLE, DATA GLASSES AND TRANSPORTATION VEHICLE FOR USE IN THE METHOD, AND COMPUTER PROGRAM

PRIORITY CLAIM

This patent application claims priority to German Patent Application No. 10 2017 221 871.1, filed 5 Dec. 2017, the disclosure of which is incorporated herein by reference in its entirety.

SUMMARY

Illustrative embodiments relate to the technical field of driver information systems, which are also known under the term infotainment system. Illustrative embodiments relate to the use of a pair of data glasses to display additional information. Such systems are intended to be used mainly in transportation vehicles in the future. Illustrative embodiments further relate to an appropriately designed pair of data glasses, an appropriately designed transportation vehicle for use in the method, and a computer program.

BRIEF DESCRIPTION OF THE DRAWINGS

Exemplary embodiments are shown in the drawings and are explained in more detail in the following by reference to the figures. Shown are.

DETAILED DESCRIPTION

At present there is intensive work being carried out on technologies designed to enable autonomous driving at a later date. A first approach to this is not intended to completely relieve the driver from his/her duties, but to ensure that the driver can take control of the transportation vehicle at any time. The driver also performs monitoring functions. Recent technologies in the field of driver information systems, such as Head-Up Displays (HUD) and data glasses, have made it possible to better inform the driver about what is happening in the environment around the transportation vehicle.

In the near future, it can therefore be assumed that on the system side, through the use of modern technologies (vehicle-to-vehicle communication, use of databases, backend integration, cloud services, server deployment, transportation vehicle sensors, etc.), comprehensive information will be available about objects (particularly, transportation vehicles) in the visible and hidden/non-visible surroundings of one's own transportation vehicle. In the field of transportation vehicle sensors, the following components enable monitoring of the surroundings: RADAR equipment, standing for Radio Detection and Ranging, LIDAR devices, standing for Light Detection And Ranging, mainly in the area of distance measurement/warning, and cameras with appropriate image processing for the field of object detection. These data relating to the environment can therefore be used as the basis for system-side driving recommendations, warnings, etc. For example, this would allow indications/warnings to be shown about the direction (possibly in the transportation vehicle's own trajectory) in which another transportation vehicle in the vicinity wants to turn off.

The vehicle-to-vehicle communication is now also possible using mobile communication with systems such as LTE, corresponding to Long Term Evolution. This is the subject of a specification with the name LTE V2x agreed by the 3GPP organization. As an alternative, systems for vehicle-direct communication are available based on WLAN technology, in particular, the system based on WLAN p. Such systems are relevant to the field of "autonomous driving". The term "autonomous driving" is sometimes used in different ways in the literature.

This concept will therefore be clarified in the following parenthesis. The term autonomous driving (sometimes also referred to as automatic driving, automated driving or piloted driving) is understood to mean the locomotion of transportation vehicles, mobile robots and driverless transport systems which behave largely autonomously. There are different gradations of the concept of autonomous driving. On certain levels the term autonomous driving is used when a driver is also present in the transportation vehicle, who is only responsible for monitoring the automatic driving operation. In Europe, the various ministries of transport (in Germany, the Federal Highway Research Institute was the body involved) collaborated to define the following autonomy levels.

Level 0: "Driver only", the driver drives, steers, accelerates, brakes, etc. him/herself.

Level 1: Certain assistance systems give assistance during the transportation vehicle operation (including a Distance Control System-Automatic Cruise Control ACC).

Level 2: Partial automation. Functions such as automatic parking, lane keeping function, general longitudinal guidance, accelerating, braking, etc. are performed by the assistance systems (including traffic jam assistant).

Level 3: High automation. The driver does not need to continuously monitor the system. The transportation vehicle independently carries out functions such as the triggering of the indicator, lane changing and lane maintenance. The driver can attend to other things, but when necessary is prompted by the system to assume control within a pre-warning period. This form of autonomy is technically feasible on motorways. The legislator is working towards approval of Level 3 transportation vehicles. The legal framework for this has already been created.

Level 4: Full automation. The control of the transportation vehicle is performed by the system throughout. If the driving tasks are no longer manageable by the system, the driver may be prompted to take over control.

Level 5: There is no driver required. Apart from setting the destination and starting the system, no human intervention is required.

Automated driving functions from Level 3 and above relieve the driver of responsibility for control of the transportation vehicle.

Due to the current development towards higher levels of autonomy, but where many transportation vehicles will still be controlled by the driver, it must be expected that appropriate additional information should already be usable in the medium term for manually guided transportation vehicles, rather than its use being deferred for use in highly automated systems in the long term.

For the driver-transportation vehicle interaction this raises the question of how this information can be displayed in such a way that genuine added value is obtained for the human driver, who is also able to locate the information provided quickly, or rather intuitively. The following solutions in this area are already known from the prior art.

A vision of the future in the transportation vehicle industry is to use the windshield of the driver's own transportation vehicle to display virtual elements to provide certain benefits for the driver. The technology used is "Augmented Reality" (AR) or "Mixed Reality" (MR) technology. Less commonly used is the corresponding German term which translates as "extended reality" or "mixed reality". In these technologies, the real environment is augmented with virtual elements. This has several benefits: Turning the gaze downwards on to displays other than the windshield is no longer necessary, since a large amount of relevant information appears when the driver looks through the windshield. Thus the driver does not need to avert his/her gaze from the road. In addition, as a result of the positionally faithful localization of the virtual elements in the real environment, less cognitive effort on the part of the driver is likely to be needed because there is no need for interpretation of a graphic on a separate display. With regard to automatic driving, added value can also be generated. In this respect, reference is made to the article "3D-FRC: Depiction of the future road course in the head-up display" by C. A. Wiesner, M. Ruf, D. Sirim and G. Klinker in the 2017 IEEE International Symposium on Mixed and Augmented Reality, in which these benefits are explained in more detail.

Since the technological resources available today are correspondingly limited, it can be assumed that in the medium term no fully display-enabled windshields will be found in transportation vehicles. Currently, Head-Up displays are used in the transportation vehicles. These also have the benefit that the HUD image appears closer to the real environment. These displays are, in fact, projection units, which project an image onto the windshield. From the point of view of the driver, however, this picture is located from a few meters to 15 meters in front of the transportation vehicle, depending on the type of module.

The "image" is composed in the following way: it is much less a virtual display than a kind of "key hole" into the virtual world. The virtual environment is theoretically placed on top of the real world and contains the virtual objects that support and inform the driver when driving. A consequence of the limited display area of the HUD is that only an excerpt of it is visible. In other words, the driver looks through the display area of the HUD at the excerpt of the virtual world. Since this virtual environment augments the real environment, it is also referred to in this case as a "Mixed Reality" scenario.

A major benefit of the previously known "Augmented Reality" (AR) displays is the ability to present the corresponding displays directly within or as part of the environment. Relatively obvious examples relate most commonly to the area of navigation. While classical navigation displays (in conventional HUDs) usually display schematic representations (for example, a right-angled arrow pointing to the right as a sign that the next right turn should be taken), AR-displays potentially offer much more effective capabilities. Since the displays can be presented as "part of the environment", extremely fast and intuitive interpretations are possible for the user.

Such Head-Up displays have the drawback that the superimposed content displayed in the HUD is only possible in a portion of the actual field of vision of the driver. Another problem is that if the driver turns or tilts his/her head, the portion in which the HUD displays are visible moves away from the central field of vision of the driver, so that it is more difficult for the driver to apprehend the on-screen information.

To solve these problems, the approach exists which uses data glasses for driver assistance systems. In these, the entire field of vision of the driver can be superimposed with virtual displays.

DE 102014206626 A1 discloses the principle of such a pair of data glasses for use in the transportation vehicle as a driver assistance system. The glasses are equipped with an electronic sensor and processing unit. This houses a unit for measuring rotation rates and acceleration values. Also, the data glasses have a communication module for wireless communication according to the BLUETOOTH® standard. Via the communication module, the glasses send the measurement data to an external control unit. The external control unit continuously receives measurement data for setting the steering angle as well as for accelerating the transportation vehicle. From this data, the control unit calculates the acceleration and rotation rate of the transportation vehicle. The external control unit subtracts the accelerations and rotation rates of the transportation vehicle calculated at the same time from the acceleration and rotation rate values that were measured in the glasses. The glasses are also equipped with at least one camera. The change in the mapping of objects in the interior of the transportation vehicle can be used to derive the motion of the data glasses, in other words the motion of the head. The data glasses are used for detecting driver fatigue.

The HoloLens data glasses from the Microsoft company are a known brand. HOLOLENS is a registered trade mark of the Microsoft company. These glasses also contain a special processing unit (holographic processing unit, HPU), which performs the calculation of the head pose based on the measurements of an IMU (Inertial Measurement Unit) which contains the rotation rate and acceleration sensors of the data glasses, and also based on the video images that are supplied by the video cameras with which the glasses are equipped. The video cameras are used to record the surroundings of the glasses. What the cameras record corresponds to a much larger area than that which is visible to the wearer of the glasses. The portion used for display is in fact specified using the calculated head pose. The images to be displayed are calculated using a graphical processing unit GPU. In addition, a central processing unit CPU, on which specific application programs can be executed, is also part of the glasses. The superimposed images calculated and output by the GPU are also adjusted to suit the display excerpt before they are actually displayed. This increases the accuracy of the image output, because the calculation of the images to be output is subject to a certain latency, and due to the continued movement of the head this would otherwise cause inaccuracy in the image output. In the case of the HoloLens glasses the display is performed by presentation on specific image output displays.

The known solutions are subject to various drawbacks. This has been recognized in the context of the disclosure. In the known data glasses for use in the area of driver assistance, there is the problem of the head motion and transportation vehicle motion being superimposed. This results in erroneous calculations of the head pose when the transportation vehicle accelerates positively or negatively along one or more directions (including during cornering or driving over uneven ground). Since the data glasses calculate an extract of the image where the virtual elements are displayed, it can quite easily happen that the displayed image excerpt is chosen incorrectly if the head motion is distorted by the transportation vehicle acceleration.

There is hence a need for further improvements in the design of data glasses, particularly with regard to the high-accuracy calculation of the head pose, to solve the problem with the incorrectly displayed image excerpt described above.

Disclosed embodiments provide a method for calculating motion data of the head of a driver of a transportation vehicle who is wearing a pair of data glasses, a pair of data glasses and a transportation vehicle intended for the use in the disclosed method, and a computer program.

As in the approach of DE 102014206626 A1, the motion data from the sensors in the transportation vehicle are transmitted wirelessly to the data glasses. They are recalculated there with the motion data of the data glasses. In DE 102014206626 A1, however, it is required that the data be measured at the same time. Because of the necessary synchronization and the lack of correspondence between the movements of the transportation vehicle and head movements, this is difficult. The disclosed embodiments take another, more practical, approach here.

Instead of the above, the accelerations of the transportation vehicle motion and head motion are acquired at the measurement intervals appropriate for each type of motion. The data for the transportation vehicle motion are transferred to the data glasses. The calculation of the head pose is performed in a special processor unit of the data glasses. A filter, for example, a Kalman filter, is implemented in the special processor unit for this purpose, which performs the calculations for the sensor fusion with an additional glasses measurement unit. The additional glasses measurement unit provides an absolute head pose at regular intervals, which is independent of the first glasses measurement unit. This is necessary because the first glasses measurement unit, which can be implemented as an IMU measurement unit, is subject to drift. In addition, the head motion data of the first glasses measurement unit are corrected by the component of the transportation vehicle motion data, to eliminate the influence of the transportation vehicle acceleration on the head motion. A highly accurate and stable head pose calculation is thus achieved, which enables the driver to have a true "Augmented Reality" experience.

It is beneficial if the additional glasses measurement unit corresponds to an image analysis unit in the data glasses, in which the images from at least one video camera of the data glasses are analyzed to calculate the absolute reference head pose independently. By image analysis, in which known reference points are defined in the cockpit of the transportation vehicle, the head pose can be calculated with high accuracy. However, the frame rate of the video camera is low and the image processing is time-consuming, so that this reference head pose can only be provided with a longer measurement interval.

It is also beneficial if the correction of the movement data of the at least one glasses measurement unit takes place by virtue of the fact that the component of motion detection which is based on the transportation vehicle acceleration is subtracted from the measured values output by the at least one glasses measurement unit. This can take place in a subtraction stage in the special processor unit.

In a further configuration of the disclosed method, the motion data from the at least one glasses measurement unit and/or the motion data from the transportation vehicle measurement unit can be smoothed, either in a common filter unit or each in a separate filter unit, before the motion data from the transportation vehicle measurement unit are subtracted from the motion data of the at least one glasses measurement unit to be corrected. The smoothing is optional, but can be beneficial for the stability of the head pose calculation if the measurement units supply noisy or distorted measurement signals.

Typically the glasses measurement unit delivers the measurement results at a higher refresh rate than the transportation vehicle measurement unit. Therefore, it is beneficial if the motion data of the transportation vehicle measurement unit are predicted in the filter unit, to be able to output temporally correct intermediate values which are compatible with the shorter measurement interval of the glasses measurement unit of the data glasses.

For a pair of data glasses to be used in the method, it is beneficial if the data glasses have a display unit with which virtual supplementary information can be displayed in the field of vision of the driver of a transportation vehicle, wherein the data glasses have at least one glasses measurement unit, which detects the movements of the driver's head. Furthermore, the data glasses have an interface for wireless communication with a communication module of a transportation vehicle, via which the data glasses receive the data from a transportation vehicle measurement unit located in the transportation vehicle for measuring at least the transportation vehicle's accelerations. The data glasses are characterized in that, to calculate the head pose, the data glasses are equipped with a special processor unit which includes an implementation of a Kalman filter, in which the motion data of the glasses measuring unit, corrected by the motion data of the transportation vehicle measuring unit, are merged with the motion data of an additional glasses measuring unit. A highly accurate and stable calculation of the head pose is possible with these data glasses. For explanation purposes, it should be mentioned that the head pose can describe 3 degrees of freedom with respect to head rotations (rotation) and 3 degrees of freedom with respect to forward motion (translation).

It is beneficial if the additional glasses measurement unit corresponds to an image analysis unit, which analyses the images from at least one video camera of the data glasses to calculate the head pose independently. In this way, the drift in the head pose calculation on the motion data of the first glasses measurement unit can be compensated.

This is beneficial if the at least one glasses measurement unit consists of an IMU sensor unit, corresponding to Inertial Measurement Unit. Although such sensor units can deliver measurement results in short measurement intervals, they are still subject to drift, so that they should be corrected or reset from time to time.

For the accuracy of the determination of the head pose it is beneficial if the data glasses have a common or a separate filter unit, in which the motion data from the at least one glasses measurement unit and/or the motion data of the transportation vehicle measurement unit are smoothed before the motion data from the transportation vehicle measurement unit are passed to a subtraction stage, in which the motion data from the transportation vehicle measurement unit are subtracted from the motion data of the at least one glasses measurement unit to be corrected.

It is very beneficial if the filter unit for the transportation vehicle measurement unit comprises a prediction unit, which predicts the motion data of the transportation vehicle measurement unit to be able to output temporally correct intermediate values, which are compatible with the shorter measurement interval of the first glasses measurement unit of the data glasses. This is the case because the glasses measurement unit typically delivers the measurement results at a higher refresh rate than the transportation vehicle measurement unit.

A further benefit is obtained if the interface for the wireless communication is designed according to at least one of the following communication systems: BLUETOOTH®, in accordance with the IEEE 802.15.1 standard, WLAN in accordance with a standard from the IEEE 802.11 standard family, ZIGBEE® according to the IEEE 802.15.4 standard or UWB, corresponding to a facet of the ultra-wide band communication. The UWB communication allows an energy efficient transmission of the data, so that the battery of the data glasses is used economically. Also, interference from other wireless communications such as vehicle-to-vehicle communications is reduced.

For a transportation vehicle to be used in the method it is beneficial that the transportation vehicle is equipped with a transportation vehicle measurement unit which detects at least the accelerations of the transportation vehicle along defined axes. Furthermore, the transportation vehicle should be equipped with a communication module for wireless communication with a pair of data glasses, thus enabling the transfer of data from the transportation vehicle measurement unit to the data glasses. It is beneficial if the transportation vehicle has a filter unit, in which the motion data of the transportation vehicle measurement unit are smoothed before being transmitted to the data glasses via the communication module.

As described above, it is additionally beneficial if the filter unit also predicts the motion data of the transportation vehicle measurement unit, to be able to output temporally correct intermediate values which are compatible with the shorter measurement interval of a glasses measurement unit of the data glasses. It is then possible to compensate for the different measurement intervals of the transportation vehicle measurement unit and glasses measurement unit.

It is further beneficial if the transportation vehicle has a communication module which is designed for communication between the transportation vehicle and the data glasses on the basis of a communication protocol according to one of the following communication systems: BLUETOOTH®, in accordance with the IEEE 802.15.1 standard, WLAN in accordance with a standard from the IEEE 802.11 standard family, ZIGBEE® according to the IEEE 802.15.4 standard or UWB, corresponding to ultra-wide band.

The corresponding benefits are obtained for a computer program which is designed accordingly, and when executed in a special processor unit of a pair of data glasses.

For a computer program which is executed in a special processor unit of the data glasses to calculate the head pose using the disclosed method, the same benefits apply as those described in relation to the disclosed method.

The following description illustrates the principles of the disclosure. It goes without saying, therefore, that persons skilled in the art will be in a position to design different arrangements which, although not explicitly described here, nevertheless embody the principles of the disclosure and are also intended to fall within its scope of protection.

Figure 1:
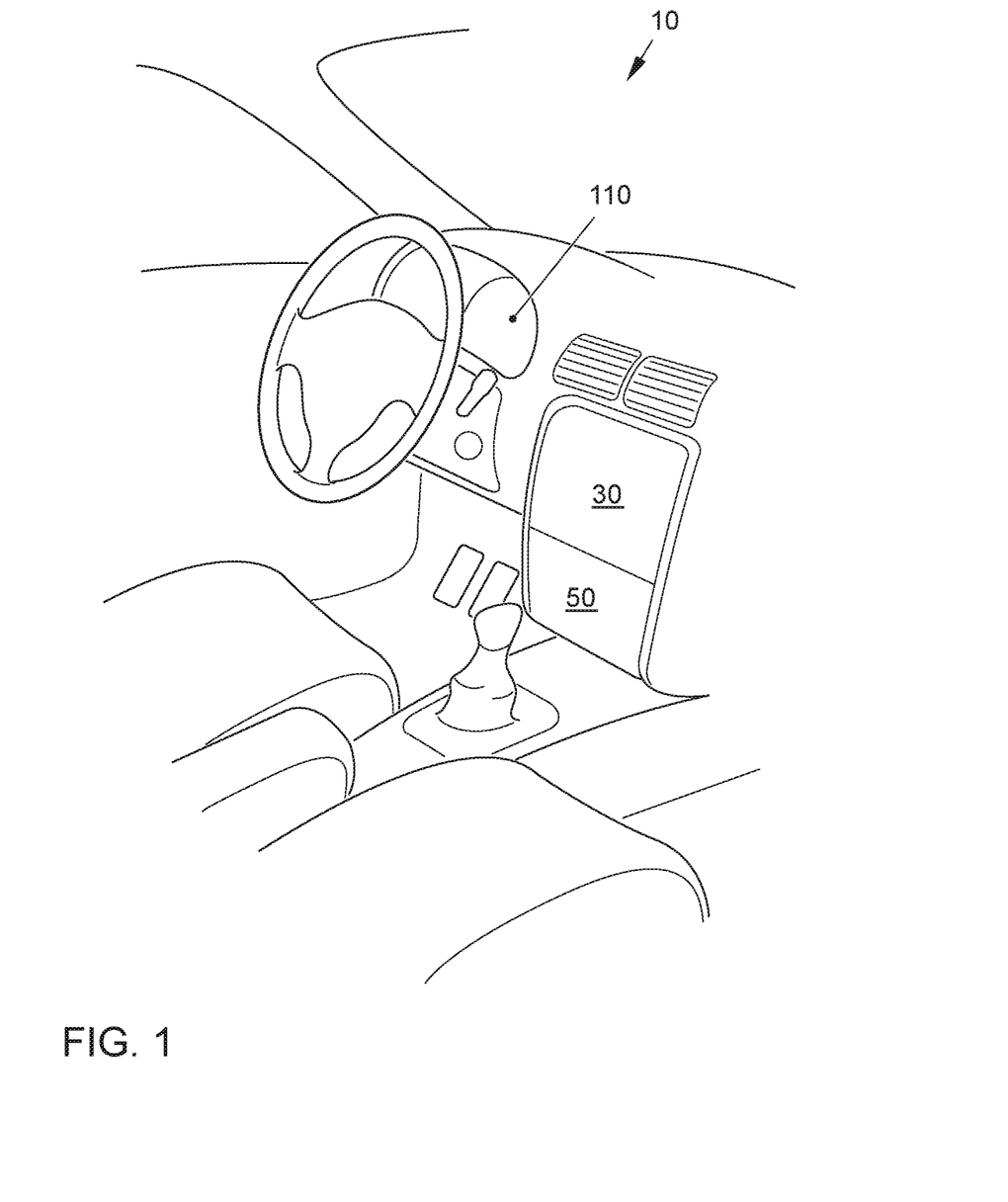
FIG. 1 shows the typical cockpit of a transportation vehicle.

FIG. 1 shows the typical cockpit of a transportation vehicle 10. The transportation vehicle shown here is a passenger car. Any other type of transportation vehicle could also be considered as the transportation vehicle 10, however. Examples of other transportation vehicles are: buses, commercial transportation vehicles, in particular, lorries, agricultural machinery, construction transportation vehicles, rail transportation vehicles etc. The use of the disclosure would be generally possible in land-based transportation vehicles, rail transportation vehicles, water-borne transportation vehicles and aircraft.

Two display units of an infotainment system are shown in the cockpit. These are a touch-sensitive screen 30, which is mounted in the center console, and the instrument cluster 110, which is mounted in the dashboard. When driving, the central console is not in the driver's field of vision. Therefore, the additional information is not overlaid on the display unit 30 when driving.

The touch-sensitive screen 30 is used to operate functions of the transportation vehicle 10. For example, it could be used to control a radio, a navigation system, a playback of stored music tracks and/or an air-conditioning system, or other electronic devices or other convenience functions or applications of the transportation vehicle 10. Collectively, this is often referred to as an "infotainment system". An infotainment system in transportation vehicles, in particular, cars, designates the combination of a car radio, navigation system, speakerphone device, driver assistance systems and other functions in a central control unit. The term infotainment is a portmanteau word, composed of the words information and entertainment. The infotainment system is operated mainly using the touch-sensitive screen 30 ("touch screen"), wherein this screen 30 can be easily viewed and operated, in particular, by a driver of the transportation vehicle 10, but also by a passenger of the transportation vehicle 10. Below the screen 30, mechanical controls such as buttons, rotary knobs or combinations thereof, such as rotary pressure knobs, can also be arranged in an input unit 50. Typically, steering wheel operation of parts of the infotainment system is also possible. This unit is not shown separately, but is considered as part of the input unit 50.

Figure 2:
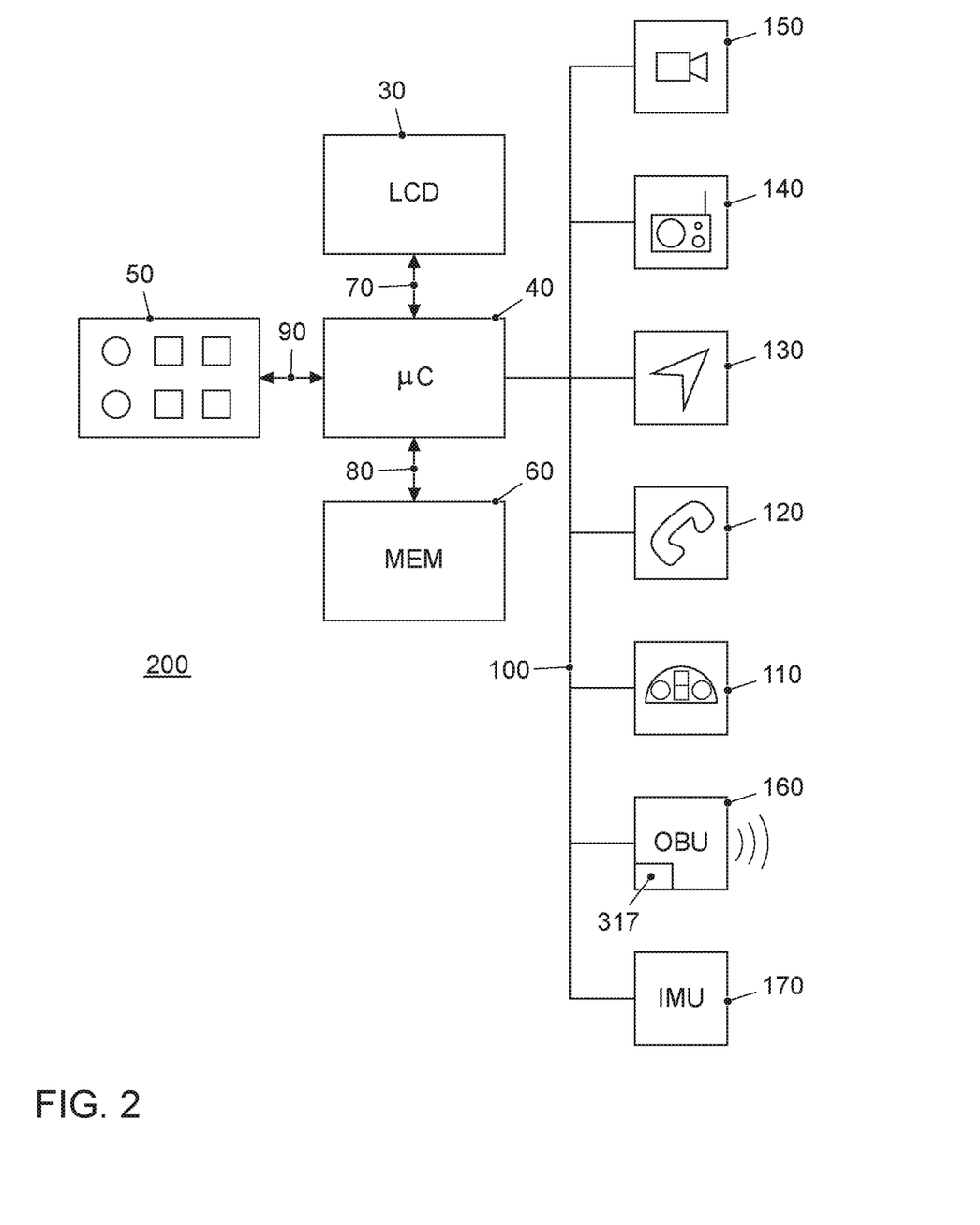
FIG. 2 shows a block interconnection diagram of the infotainment system of the transportation vehicle.

FIG. 2 shows a schematic block interconnection diagram of the infotainment system 200 and some examples of sub-systems or applications of the infotainment system. Thus, the control device comprises the touch-sensitive display unit 30, a processing device 40, an input unit 50 and a memory 60. The display unit 30 comprises both a display area for displaying variable graphical information, and a control surface (touch-sensitive layer) positioned above the display area for entering commands by a user.

The display device 30 is connected to the processing device 40 via a data line 70. The data line can be designed according to the LVDS standard, corresponding to Low Voltage Differential Signaling. Via the data line 70 the display unit 30 receives control data for controlling the display area of the touch screen 30 from the processing device 40. Via the data line 70, control data from the input commands are also transmitted from the touch screen 30 to the processing device 40. The reference numeral 50 designates the input unit. Associated with this are the above-mentioned controls such as buttons, rotary knobs, slider controls, or rotary pressure knobs, with which the operator can make entries via the menu navigation. The term entry is understood generally to mean calling up a selected menu option, as well as changing a parameter, switching a function on and off etc.

The storage device 60 is connected to the processing device 40 via a data line 80. The memory 60 contains a stored catalog of icons and/or a symbol catalog with the icons and/or symbols for the possible display items of additional information. The points/symbols which are used as a basis for the calculation of the grid-based display can also be stored here.

The other parts of the infotainment system, camera 150, radio 140, navigation device 130, telephone 120 and instrument cluster 110 are connected to the device for operating the infotainment system via the data bus 100. The high-speed property of the CAN bus in accordance with ISO standard 11898-2 is a suitable choice for the data bus 100. Alternatively, the use of a bus system based on Ethernet technology, such as BroadR-Reach, is also possible. Bus systems in which the data transmission takes place via fiber-optic cables can also be used. Examples to be cited are the MOST bus (Media Oriented System Transport) or the D2B bus (Domestic Digital Bus). A transportation vehicle measurement unit 170 is also connected to the data bus 100. This transportation vehicle measurement unit 170 is used to detect the motion of the transportation vehicle, in particular, for detecting the accelerations of the transportation vehicle. It can be designed as a conventional IMU unit, corresponding to Inertial Measurement Unit. An IMU unit typically contains accelerometers and angular rate sensors, such as a laser gyroscope or a magnetometer gyroscope. It is also noted here that the camera 150 can be designed as a conventional video camera. In this case, it records up to 25 full frames/s, which in the interlaced recording mode corresponds to 50 half-frames/s. Alternatively, a special camera which records more images/s can be used to increase the accuracy of the object detection for faster moving objects, or one which detects light in a spectrum other than the visible spectrum. A plurality of cameras can be used for monitoring the surroundings. In addition, the radar or lidar systems already mentioned can be used in addition or as alternatives, to carry out or extend the monitoring of the environment. For wireless communication internally and externally, the transportation vehicle 10 is equipped with a communication module 160. This module is often referred to as an on-board unit. It can be designed for mobile radio communication, e.g., based on the LTE standard, corresponding to Long Term Evolution. It can also be designed for WLAN communication, in accordance with Wireless LAN, either for communication with devices belonging to the occupants of the transportation vehicle or for the vehicle-to-vehicle communication etc.

Figure 3:
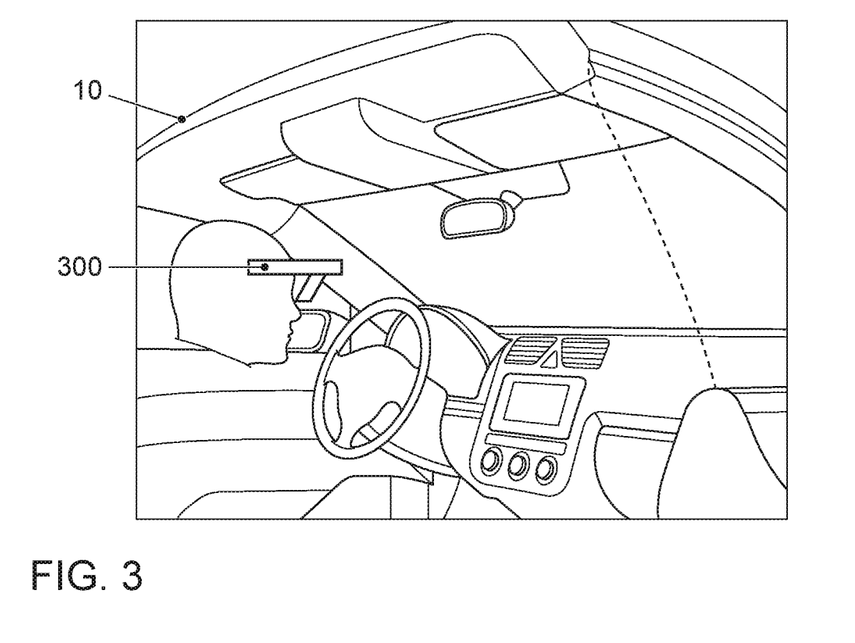
FIG. 3 shows a second illustration of the cockpit of the transportation vehicle with a driver, in which the driver is wearing a pair of data glasses for providing driver information.
Figure 4:
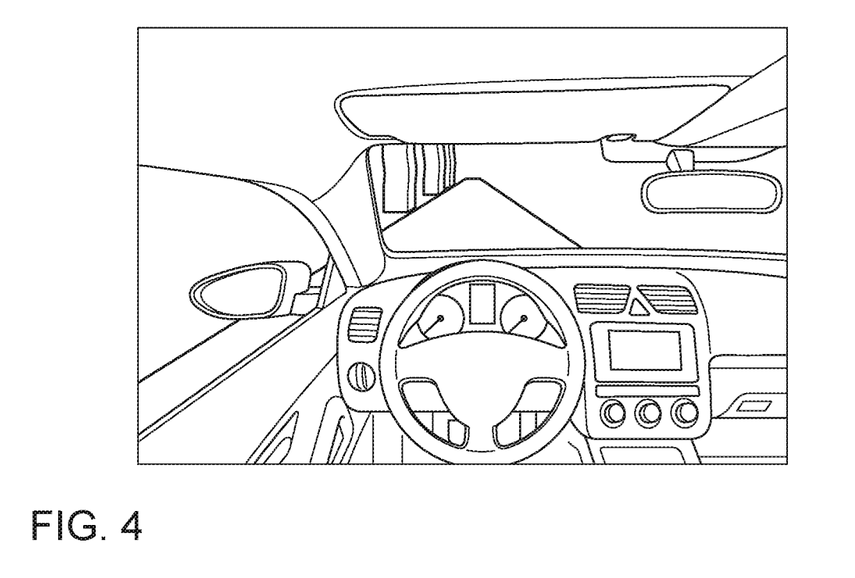
FIG. 4 shows an illustration of the resulting view through the data glasses for the driver without AR images displayed.

FIG. 3 shows the cockpit of the transportation vehicle 10 and the head of the driver of the transportation vehicle 10, who is wearing the data glasses 300. Since the glasses are transparent with "glasses" made of glass or plastic or another material, the view through the data glasses appears as shown in FIG. 4. The driver sees the road on which he/she is driving and the environment of the transportation vehicle 10 through the glass windows of the transportation vehicle 10. Also in the driver's field of view are large parts of the cockpit, such as the steering wheel, instrument cluster 110, touch-sensitive display unit 30 and the control unit 50. In the case illustrated no AR-overlays are displayed in the driver's view, and so the image is the same as the view through a normal pair of glasses.

The way in which the head pose can be calculated with high accuracy and stability is explained in the following.

Figure 5:
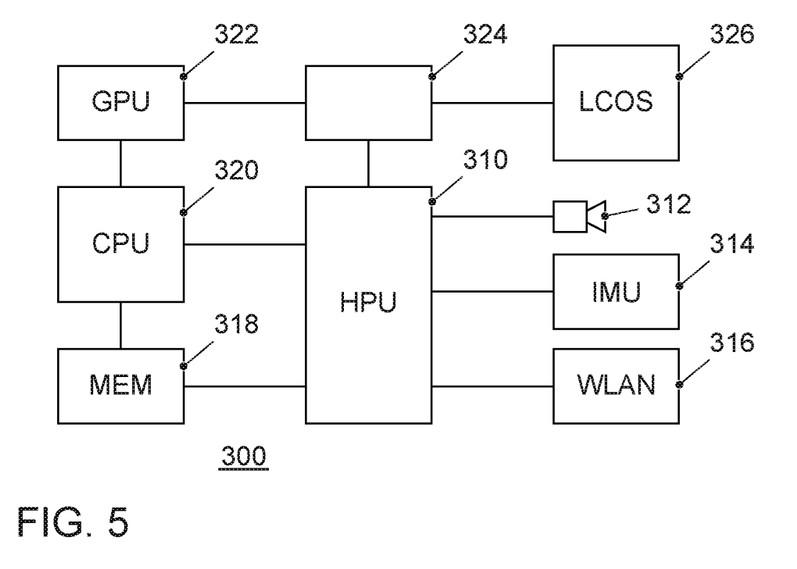
FIG. 5 shows a block interconnection diagram with the components of the data glasses.

FIG. 5 shows a block interconnection diagram of the data glasses 300. The glasses shown are based on the hardware architecture of the Hololens glasses from the Microsoft company. Reference number 310 designates a special processor unit HPU, corresponding to "Holographic Processing Unit". A video camera 312 is connected thereto. However, it is also possible to connect more video cameras. In the Hololens glasses available from Microsoft, 4 video cameras are connected. These allow the recording of the environment with a much wider viewing angle than the driver can capture when looking through the glasses. In addition, a glasses measurement unit IMU 314 is connected to the special processor unit 310. This is used to measure the movements of the driver's head, in particular, head rotations and head tilts. The special processor unit 310 is also connected on the input side to an interface 316 for the wireless communication. In the example shown this is a WLAN module. It can be a conventional WLAN module for communication according to the WLAN n standard, i.e., IEEE 802.11n. Alternatively, the communication module 316 can be designed according to another communication standard such as BLUETOOTH®, according to the IEEE 802.15.1 standard, ZIGBEE® according to the IEEE 802.15.4 standard, or UWB, according to a facet of the Ultra-Wide Band communication. The facet with an ultra-wide band communication would have the benefit of very energy-efficient transmission of the data, so that the battery of the data glasses 300 would be subject to less loading. Also, interference effects due to other wireless transmissions, such as those often occurring in modern transportation vehicles, e.g., for the vehicle-to-vehicle communication, are only very slightly worsened. This is due to the fact that the other communications take place in narrow channels with strong energy concentration, while the UWB communication occurs over a very broad bandwidth with weak energy concentration. The measurement data are received from the transportation vehicle measurement unit 170 via the WLAN module 316. The data glasses 300 are additionally equipped with a central unit 320, which receives the data for the measured head pose from the special processor unit 310. This is also in connection with a storage unit 318. This is also used for buffering the video data supplied by the camera 312. The central unit 320 provides instructions to the graphics unit 322, which performs the calculation of the images for the AR screen displays. It is a graphics engine, such as, a graphical processing unit GPU. To calculate the AR display items in the correct position corresponding to the head pose, the head pose calculation must be as accurate and stable as possible. As already described in connection with the Hololens glasses, the superimposed images calculated and output by the GPU are also adjusted to suit the display portion before they are actually displayed. This increases the accuracy of the image output, because the calculation of the images to be output is subject to a certain latency and due to the continued motion of the head this would otherwise cause inaccuracy in the image output. The portion of the image that is to be displayed is varied in the post-processing unit 324 (finely adjusted) around the value which is specified by the continuation of the head pose calculated in the special processor unit 310. Finally, the finished "rendered" images arrive at the display unit 326 of the data glasses 300. In the Hololens glasses the display unit 326 is of the LCOS type, or Liquid Crystal on Silicon, which projects the images onto the lenses of the glasses.

The basis for the calculation of the head pose is also formed by the data supplied by the video camera 312 of the data glasses 300. For this purpose the image is processed in an image processing unit 319. The images captured by the video camera contain prominent points in the cockpit, which serve as a reference. The location of these points in the image is determined by image processing algorithms. The output obtained is the measured value for the head pose. Since the measured values of the glasses measurement unit 314 and of the transportation vehicle measurement unit 170 are affected by drift, the measurement data determined from the camera data are used to perform a "reset" of the tracking back to a stable head pose. The camera data provide reference data, so to speak, for the ongoing calibration of the IMU data from the measurement units 314 and 170. Since the video camera 312 only provides images at a 30 Hz frame rate and the image processing also takes time, the reference data are supplied at a lower refresh rate than the IMU data from the measurement units 314 and 170. The data from the transportation vehicle measurement unit 170 are typically supplied at a frequency of 100 Hz. The data from the glasses measurement unit 314 are even supplied at a frequency of 1000 Hz in the case of the Hololens glasses. Between the calibration operations with the reference data from the camera in the region of 30 Hz the drift in the data from the transportation vehicle measurement unit 170 and glasses measurement unit 314 is acceptable.

Figure 6:
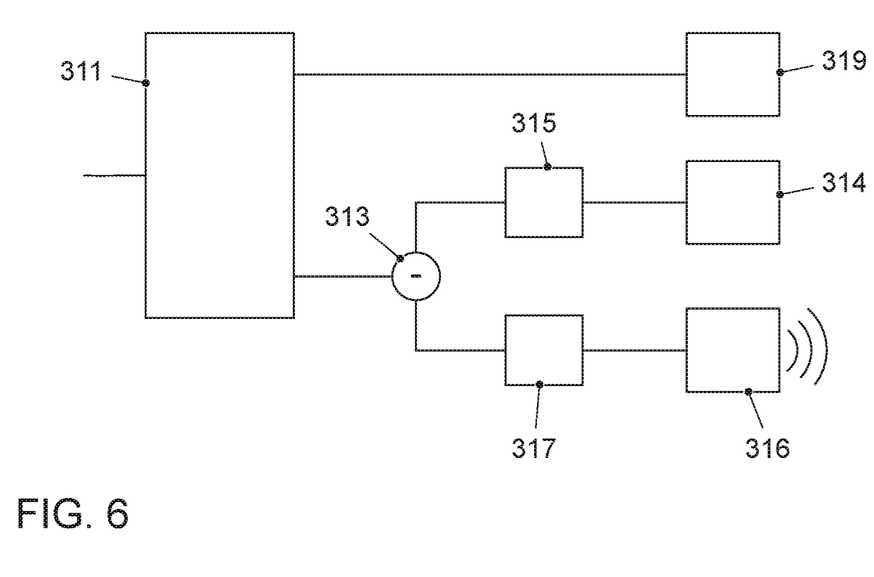
FIG. 6 shows a block interconnection diagram of the special processor unit for the implementation of the sensor fusion with Kalman filter.
Figure 7:
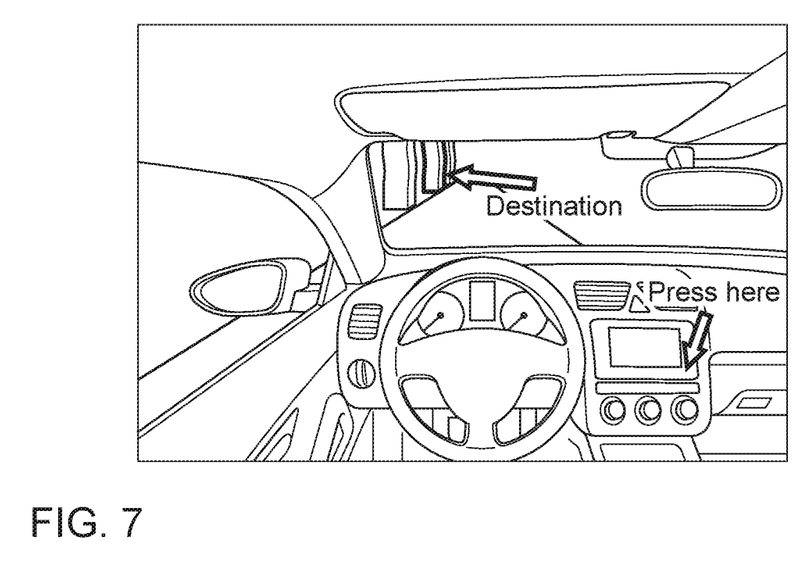
FIG. 7 shows an illustration of the resulting view through the data glasses for the driver with AR images displayed.

FIG. 6 shows a block interconnection diagram for the processing of the various types of sensor data in the special processor unit 310. The data from the glasses measurement unit 314 are preprocessed in an optional filter unit 315. Smoothing of the measurement values takes place here. It may be performed by a FIR-filter, or Finite Impulse Response filter. In the simplest case, a mean value filter can be used for this purpose. Parallel to this, the data from the transportation vehicle measurement unit 170, which are supplied by the WLAN module 316, are smoothed in a corresponding filter unit 317. In the following subtraction stage 313, the respective smoothed measurement data of the transportation vehicle measurement unit 170 are deducted from the respective measurement data from the glasses measurement unit 314. The reason for this is that the measurement data from the glasses measurement unit reflect the combined motion consisting of the motion component of the transportation vehicle and the motion component of the head. The subtraction eliminates the influence of the motion component of the transportation vehicle 10 in the measurement data.

With regard to the different measuring rates of the glasses measurement unit 314 and the transportation vehicle measurement unit 170, the following procedure can be used. As described, the transportation vehicle measurement interval is longer than the glasses measurement interval. Therefore, one possible way to proceed is that the last registered measurement delivered by the processing in the branch of the transportation vehicle measurement unit 170 is subtracted in each case from each subsequent measurement in the branch of the glasses measurement unit 314, until a new measurement value arrives in the branch of the transportation vehicle measurement unit 170.

Alternatively, a prediction model in the filter unit 317 can predict the next measurement value from the transportation vehicle measurement unit 170. Between the current point in time at which a transportation vehicle measurement value is available and the next point in time at which a new measurement from the transportation vehicle measurement unit 170 is expected, it is possible to perform a continuous linear interpolation. This linear interpolation is designed in such a way that for each time at which a measurement value can be expected from the glasses, an interpolated prediction value is available. In the example shown, the interpolation would take place in the filter unit 316. But it would also be possible to position the entire filter unit in the transportation vehicle, so that the filtered data would then already have been supplied by the WLAN module 316 and the special processor unit 310 does not need to perform this operation.

The measurement data from the transportation vehicle measurement unit 170 thus combined yield a measurement of the head pose. These head-pose measurements together with the head-pose measurements originating from the image analysis unit 319 are merged in the subsequent Kalman filter unit 311.

Kalman filters have been used very successfully for the sensor fusion of head-pose measurements. Such Kalman filter units are known from the literature and will therefore not be explained in detail here. An example reference is the paper by Guy Berg: "The Vehicle in the Loop—a tool for the development and evaluation of safety-critical driver assistance systems", which describes the use of Kalman filters for this purpose. The exact reference for this paper is:

Guy Berg: "The vehicle in-the-loop—a tool for the development and evaluation of safety-critical driver assistance systems", dissertation in the Department of Aerospace Engineering at the University of the Federal Armed Forces in Munich (2014), http://athene-forschung.unibw.de/node?id=97267.

With regard to the disclosure, this citation is explicitly incorporated by reference.

The data supplied at the output of the Kalman filter unit 311 are those of a stable head pose, which has been "cleaned" of movements/accelerations of the transportation vehicle. This information is forwarded to the central unit 320 where it is converted into instructions to the graphics unit 322, as previously described.

An example of an AR display provided by the data glasses 300 is shown in FIG. 6. In the figure, two AR-displays can be seen correctly positioned. On the one hand, the driving route destination specified by the navigation system 130 is highlighted in the display image of the data glasses 300. The superimposed display is calculated, taking into account the head pose, in such a way that it is positioned exactly at the entrance to the destination, which is visible through the windshield. In addition, the word "Destination" is displayed next to it. The second AR display item relates to an operating instruction for the driver. In that case an indicating arrow highlights the control knob on the control unit 50, which the driver should press to exit the navigation because the destination has been reached. In addition, the instruction "Press here" is displayed next to it. In this example, both the real environment outside of the transportation vehicle and the operating area of the cockpit within the transportation vehicle are augmented by additional information. Such a "Virtual Reality" experience would not be possible with a head-up display. To be able to calculate such AR overlaid displays in a positionally accurate way, additional information will need to be transmitted from the on-board unit 160 to the interface 316 of the data glasses 300. Thus, for example, the destination to be displayed will be transmitted from the navigation system 130. At the same time, the position of the transportation vehicle 10 must be transmitted.

All examples mentioned herein, as well as conditional formulations, are to be understood as being without limitation to such specifically mentioned examples. Thus, for example, it will be acknowledged by persons skilled in the art that the block diagram shown here represents a conceptual view of an exemplary circuit arrangement. In a similar way it should be recognized that any illustration of a flow chart, state transition diagram, pseudo-code and the like represents different embodiments for the purpose of illustrating processes which are essentially stored in computer-readable media and can therefore be executed by a computer or processor. The object referred to in the claims can explicitly also be a person.

It should be understood that the proposed method and the associated devices can be implemented in various forms of hardware, software, firmware, special processors or a combination of these. Special processors can comprise application specific integrated circuits (ASICs), Reduced Instruction Set Computers (RISC) and/or Field Programmable Gate Arrays (FPGAs). Optionally, the proposed method and the device are implemented as a combination of hardware and software. The software may be installed as an application program on a software storage device. Typically, this will be a machine based on a computer platform, which has hardware such as one or more central processing units (CPU), a random access memory (RAM) and one or more input/output (I/O) interface(s). In addition, an operating system is typically installed on the computer platform. The various processes and functions which have been described here can either be part of the application program, or executed as part of the operating system.

The disclosure is not limited to the exemplary embodiments described here. There is scope for various adaptations and modifications, which the person skilled in the art due to his expertise would also consider as belonging to the disclosure.

The disclosed embodiments are described in greater detail in the exemplary embodiments based on the example of its use in transportation vehicles. Reference is also made to the possibility of application in aircraft and helicopters, for example, in landing maneuvers or search operations, etc.

Even in remote-controlled devices such as robots, in which the remote control is performed via a monitor on which a camera image is displayed, AR displays can also simplify their operation. Thus a possible application also exists in this area. Other possible applications relate to a smartphone, a tablet computer, a personal assistant or a pair of virtual reality glasses.

LIST OF REFERENCE NUMERALS 10 transportation vehicle
30 touch-sensitive display unit
40 processing Unit
50 input unit
60 storage unit
70 data line to the display unit
80 data line to the storage unit
90 data line to the input unit
100 data bus
110 instrument cluster
120 telephone
130 navigation device
140 radio
150 camera
160 communication module
170 transportation vehicle measurement unit
200 infotainment system
300 data glasses
310 special processor unit
311 Kalman filter unit
312 video camera
313 subtraction stage
314 glasses measurement unit
315 filter unit
316 communication interface
317 filter unit
318 memory
319 image analysis unit
320 central processing unit
322 graphics unit
324 fine adjustment unit
326 display unit

The invention claimed is:

1. Data glasses for use in a method for calculating the positional and motion data of the head pose of a driver of a transportation vehicle, wherein the driver wears a pair of the data glasses, wherein the data glasses comprise:
    at least one glasses measurement unit which detects the movements of the head pose and generates motion data;
    a wireless communication interface, wherein the transportation vehicle is equipped with a transportation vehicle measurement unit which detects at least the accelerations of the transportation vehicle, wherein transportation vehicle motion data including the measured accelerations of the transportation vehicle are transferred wirelessly from a communication module of the transportation vehicle to the data glasses via the wireless communication interface;
    a special processor unit, wherein the calculation of the head pose is performed in the special processor unit, which includes a filter unit that includes a Kalman filter in which the motion data generated by the at least one glasses measurement unit are corrected based on the transportation vehicle motion data, and merged with the motion data generated by an additional glasses measurement unit;
    a display unit with which virtual additional information is overlaid in a field of vision of the driver of the transportation vehicle; and
    a common or a separate filter unit in which the transportation vehicle motion data are smoothed before the transportation vehicle motion data are passed to a subtraction stage in which the transportation vehicle motion data are subtracted from the motion data of the at least one glasses measurement unit to be corrected.

2. The data glasses of claim 1, wherein the additional glasses measurement unit corresponds to an image analysis unit which analyzes images from at least one video camera to calculate the head pose.

3. The data glasses of claim 1, wherein the at least one glasses measurement unit includes at least one inertial measurement unit sensor unit.

4. The data glasses of claim 1, wherein the filter unit comprises a prediction unit which predicts the transportation vehicle motion data to output temporally correct intermediate values which are compatible with a shorter measurement interval of the at least one glasses measurement unit of the data glasses.

5. The data glasses of claim 1, wherein the interface for the wireless communication is designed according to at least one of the following communication systems: BLUETOOTH®, in accordance with the IEEE 802.15.1 standard, WLAN in accordance with a standard from the IEEE 802.11 standard family, ZIGBEE® according to the IEEE 802.15.4 standard or UWB, according to a facet of the ultra-wide band communication.

6. A transportation vehicle for use in a method for calculating the positional and motion data of the head pose of a driver of the transportation vehicle, wherein the driver wears a pair of the data glasses, the transportation vehicle comprising:
- at least one transportation vehicle measurement unit which detects motion data that includes at least the measured accelerations of the transportation vehicle; and
- a communication module that transmits the transportation vehicle motion data including the measured accelerations of the transportation vehicle to the data glasses via a wireless communication interface of the data glasses; and
- a filter unit in which the motion data of the transportation vehicle measurement unit are smoothed before being sent via the communication module to the data glasses, where the transportation vehicle motion data are passed to a subtraction stage in which the transportation vehicle motion data are subtracted from the motion data of the data glasses.

7. The transportation vehicle of claim 6, wherein the motion data of the transportation vehicle measurement unit is predicted in the filter unit to output temporally correct intermediate values which are compatible with the shorter measurement interval of a glasses measurement unit of the data glasses.

8. The transportation vehicle of claim 6, wherein the communication between the transportation vehicle and the data glasses is carried out based on a communication protocol according to one of the following communication systems: BLUETOOTH®, in accordance with the IEEE 802.15.1 standard, WLAN in accordance with a standard from the IEEE 802.11 standard family, ZIGBEE® according to the IEEE 802.15.4 standard or UWB, corresponding to ultra-wide band.

9. A computer-readable media including a computer program wherein the computer program includes instructions, when processed in a special processor unit of a pair of data glasses, to calculate a head pose of a transportation vehicle driver that includes positional and motion data of the head pose, wherein the driver wears a pair of data glasses equipped with at least one glasses measurement unit which detects the movements of the head of the driver to generate motion data, wherein the transportation vehicle is equipped with a transportation vehicle measurement unit which detects at least the accelerations of the transportation vehicle to generate transportation vehicle motion data,
- wherein the transportation vehicle motion data including the measured accelerations of the transportation vehicle are transferred wirelessly to the data glasses, wherein the calculation of the head pose is carried out in the special processor unit of the data glasses, which includes a filter unit that includes a Kalman filter in which the motion data of glasses measurement unit, are corrected by the motion data of the transportation vehicle measurement unit, and merged with the motion data of an additional glasses measurement unit; and
- wherein the motion data of the transportation vehicle measurement unit are smoothed, either in a common filter unit or each in separate filter units, before the motion data from the transportation vehicle measurement unit are subtracted from the motion data of the at least one glasses measurement unit to be corrected.

10. A method for calculating the positional and motion data of a head pose driver of a transportation vehicle, wherein the driver wears a pair of data glasses equipped with at least one glasses measurement unit, the method comprising:
- detecting motion data including movements of the head of the driver using the at least one glasses measurement unit;
- detecting at least the accelerations of the transportation vehicle using a transportation vehicle measurement unit included in the transportation vehicle;
- transferring the measured accelerations of the transportation vehicle wirelessly to the data glasses;
- calculating the head pose in a special processor unit of the data glasses, wherein the calculation includes operation of a filter unit in the special processor unit to correct the motion data generated by the data glasses based on the motion data of the transportation vehicle measurement unit, and to merge the corrected motion data with motion data of an additional glasses measurement unit,
- wherein the motion data from the at least one glasses measurement unit and/or the motion data of the transportation vehicle measurement unit are smoothed, either in a common filter unit or each in separate filter units, before the motion data from the transportation vehicle measurement unit are subtracted from the motion data of the at least one glasses measurement unit to be corrected.

11. The method of claim 10, wherein the additional glasses measurement unit corresponds to an image analysis unit wherein the images from at least one video camera are analyzed to calculate the head pose.

12. The method of claim 10, wherein the correction of the motion data of the at least one glasses measurement unit takes place by subtracting a component of motion detection that is based on the transportation vehicle acceleration from the measured motion data which are detected by the at least one glasses measurement unit.

13. The method of claim 10, wherein the motion data from the at least one glasses measurement unit and/or the motion data of the transportation vehicle measurement unit are smoothed, either in a common filter unit or each in separate filter units, before the motion data from the transportation vehicle measurement unit are subtracted from the motion data of the at least one glasses measurement unit to be corrected.

14. The method of claim 10, wherein the motion data of the transportation vehicle measurement unit are predicted in the filter unit to output temporally correct intermediate values which are compatible with the shorter measurement interval of the glasses measurement unit of the data glasses.

* * * * *